May 9, 1950 R. F. WEHRLIN ET AL 2,507,326
PRESSURE RESPONSIVE SPEED CONTROLLER
Filed Oct. 4, 1945 4 Sheets-Sheet 2

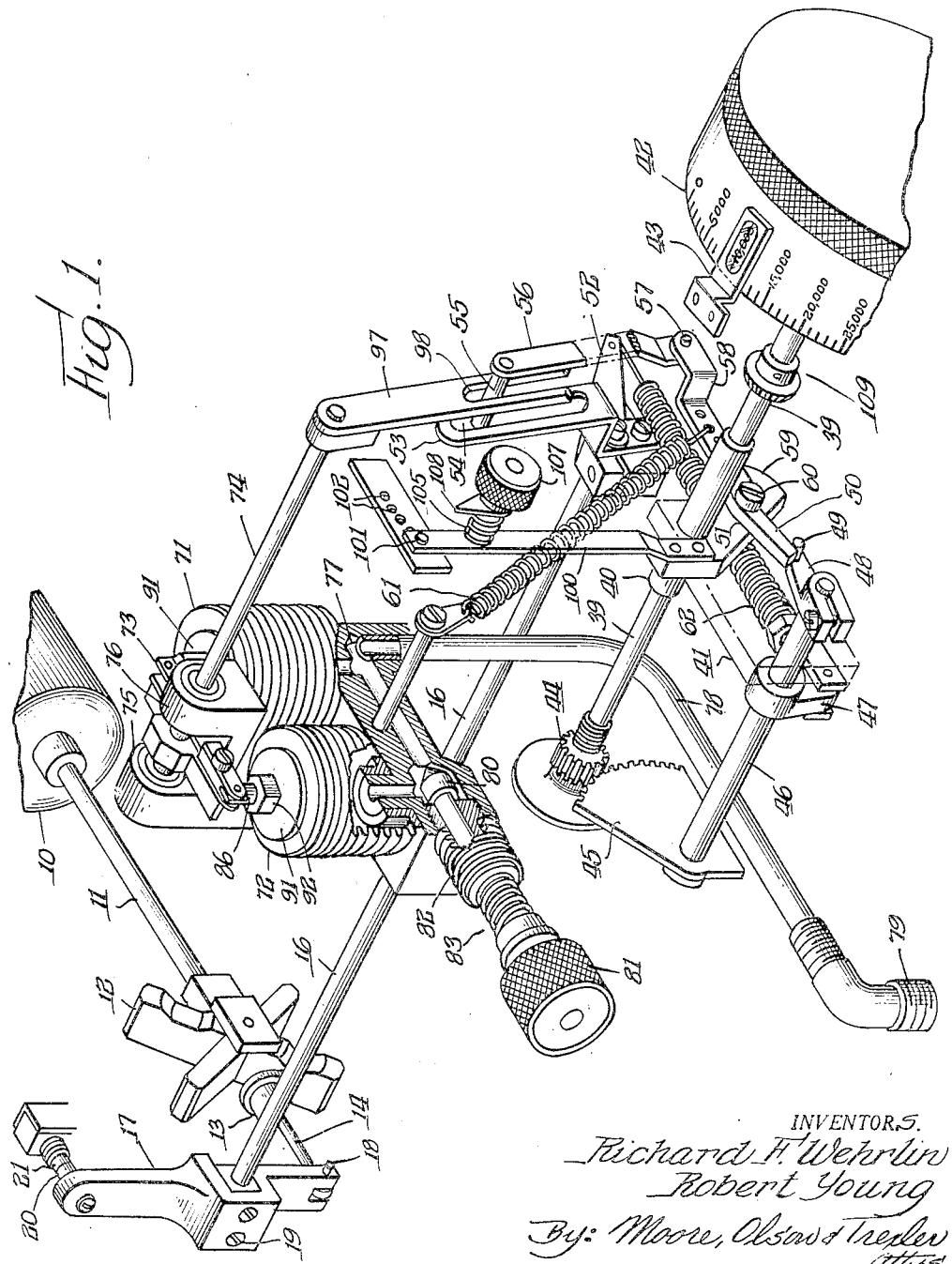

May 9, 1950 R. F. WEHRLIN ET AL 2,507,326
PRESSURE RESPONSIVE SPEED CONTROLLER
Filed Oct. 4, 1945 4 Sheets-Sheet 3
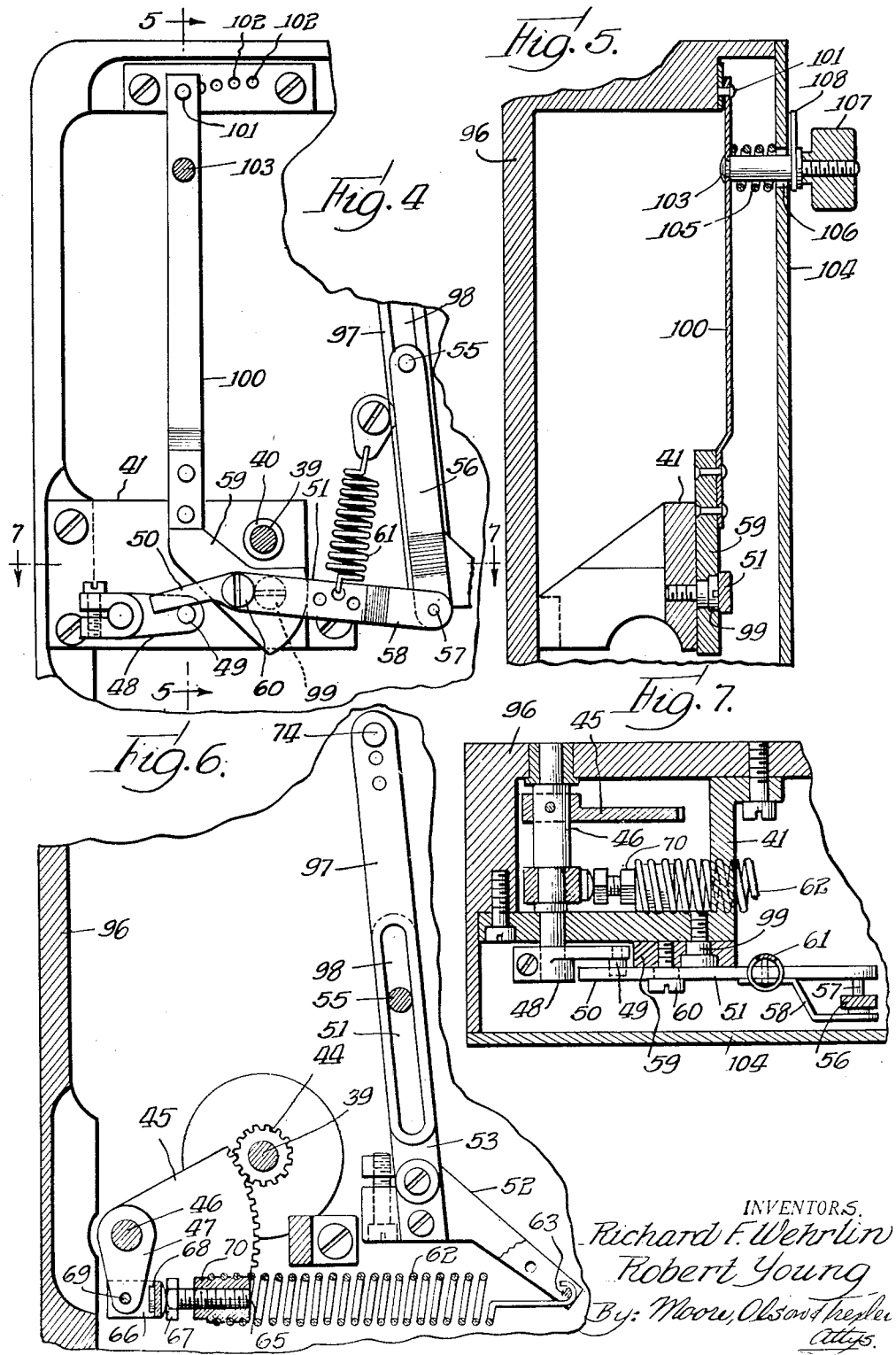
INVENTORS.
Richard F. Wehrlin
Robert Young
By: Moore, Olson & Trexler
Attys.

May 9, 1950 — R. F. WEHRLIN ET AL — 2,507,326
PRESSURE RESPONSIVE SPEED CONTROLLER
Filed Oct. 4, 1945 — 4 Sheets-Sheet 4
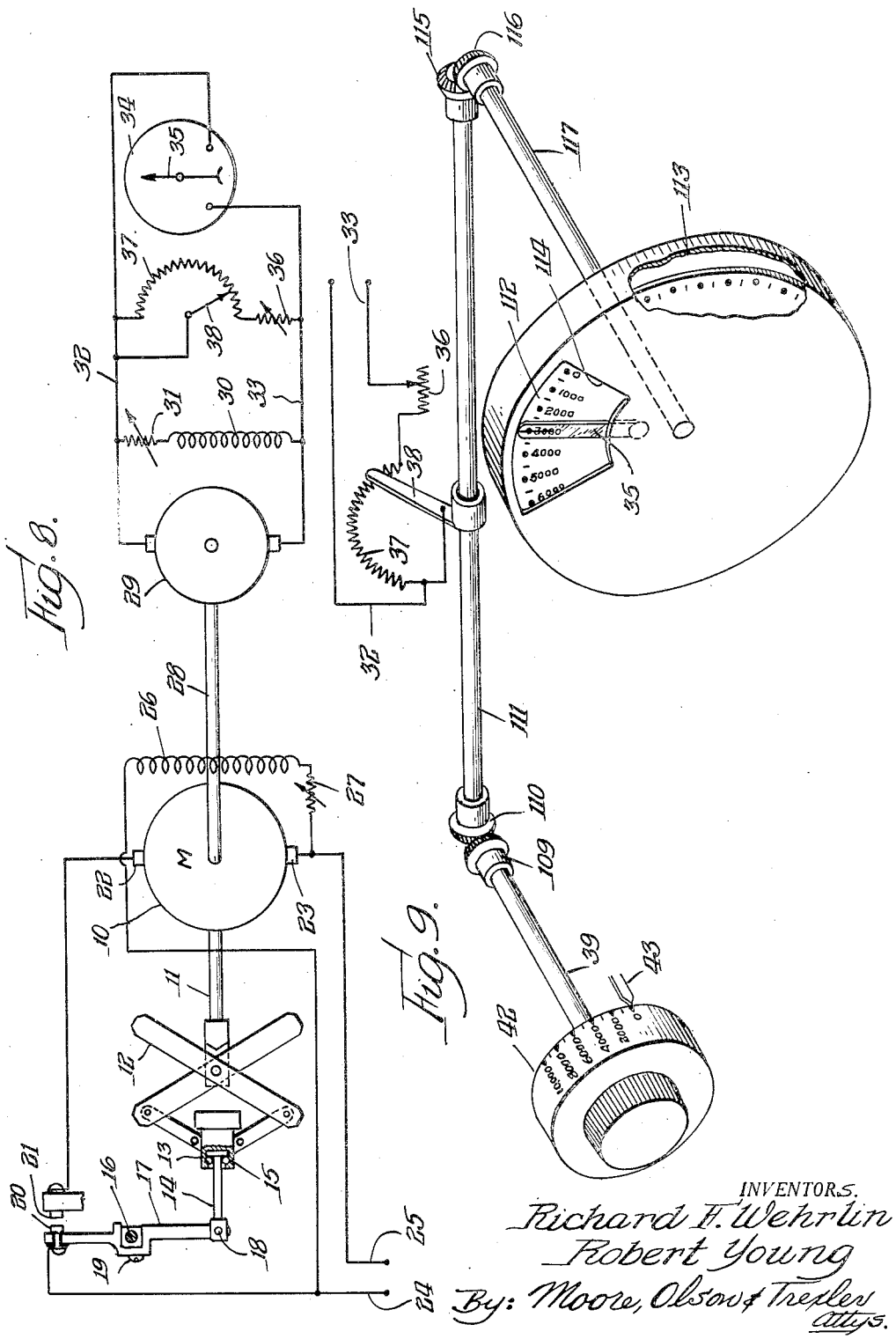
INVENTORS.
Richard F. Wehrlin
Robert Young
By: Moore, Olson & Trexler
Attys.

Patented May 9, 1950

2,507,326

UNITED STATES PATENT OFFICE 2,507,326

PRESSURE RESPONSIVE SPEED CONTROLLER

Richard F. Wehrlin, New York, and Robert Young, Douglaston, N. Y., assignors, by mesne assignments, to The Norden Laboratories Corporation, White Plains, N. Y., a corporation of Connecticut Application October 4, 1945, Serial No. 620,232

4 Claims. (Cl. 318—308)

Our invention relates to pressure responsive speed controllers, and more particularly to pressure responsive speed controllers adapted for use as altimeters, in bombsights, and of general application.

In the prior art, altimeters for airplanes are substantially devices which measure altitude as a function of the absolute pressure existing in the atmosphere surrounding the plane at its altitude. Corrections must be made for barometric pressure and the present instruments become increasingly inaccurate at higher altitudes due to the fact that there is a smaller change in pressure for a given change in altitude at higher altitudes. Furthermore, an absolute motion of the pressure responsive element must take place over a comparatively large range. This results in inaccuracy introduced by lost motion and by hysteresis.

One object of our invention is to provide a pressure responsive device of general application.

Another object of our invention is to provide a pressure responsive device which is accurate over the entire range from sea level to 50,000 feet of altitude or higher if desired.

Another object of our invention is to provide an altimeter which is responsive to extremely small pressure differences.

Another object of our invention is to provide an altimeter in which a scale of any desired amplitude may be employed.

Another object of our invention is to provide an accurate altimeter which may be easily calibrated.

Still a further object of our invention is to provide an altimeter or similar device in which correction is made for the elevation of a landing field above sea level.

Other and further objects of our invention will appear from the following description.

In the accompanying drawings, which form part of the instant specification, and which are to be read in conjunction therewith, and in which like reference numerals are used to show like parts in various views:

Fig. 1 is a diagrammatic view of apparatus showing one embodiment of our invention.

Fig. 2 is a sectional elevation of a device showing one embodiment of our invention, taken along the line 2—2 of Fig. 3.

Fig. 3 is a sectional elevation of the device shown in Fig. 2 taken along the line 3—3 of Fig. 2.

Fig. 4 is a sectional view taken along the line 4—4 of Fig. 3.

Fig. 5 is a sectional view taken along the line 5—5 of Fig. 4.

Fig 6 is a sectional view taken along the line 6—6 of Fig. 3.

Fig. 7 is a sectional view taken along the line 7—7 of Fig. 4.

Fig. 8 is a diagrammatic view showing the electrical connections employed in our invention.

Fig. 9 is a fragmentary perspective view showing a detail of our invention.

In general, our invention contemplates the provision of an electric motor with means for controlling the motor's speed inversely proportional to the absolute altitude of the plane in which an altimeter of our invention is positioned. We provide means for controlling the motor to decrease its speed as a function of the pressure of the atmosphere at an altitude which is a predetermined distance above or below an antecedently determined altitude. In other words, as will be more apparent hereinafter, our control is responsive to small pressure differences rather than to the pressure difference between the air pressure at sea level and the air pressure at the altitude of a plane. We provide means for indicating an altitude inversely proportional to the motor speed, that is to say, a high motor speed will indicate a low altitude, while a lower motor speed will indicate a high altitude.

Referring now to Fig. 8, we provide an electric motor 10 having a shaft 11 driving a centrifugal governor 12. The arrangement is such that centrifugal force will cause the links of the governor to fly outwardly, moving a rotary sleeve 13 linked to the governor to the right as viewed in Fig. 8. A stationary rod 14 is connected to the sleeve 13 by means of a thrust bearing 15. The end of the rod 14 is pinned to a lever 17 by means of pin 18. The lever 17 is secured to a shaft 16 for movement therewith in any suitable manner, as for example, by machine screws 19. The upper end of lever 17 carries a contact point 20 adapted to make contact with the contact point 21. The brushes 22 and 23 of the motor 10 are connected across any suitable source of potential connected with conductors 24 and 25. The armature circuit of the motor 10 is completed through the contact points 20 and 21. The field winding 26 of the motor is provided with an adjustable resistance 27. The motor is connected by shaft 28 or in any other suitable manner to the armature of a small generator 29. The field winding 30 of the generator 29 is likewise provided with an adjustable resistance 31. The output of the generator 29 is connected by conductors 32 and 33 to a galvanometer 34. The winding of the galvanometer 34 is such that the pointer 35 thereof is adapted to move clockwise upon an increase in potential across the conductors 32 and 33. In parallel with the galvanometer 34 we place a resistance having a lower branch 36 adapted to be varied manually, and an upper branch 37 adapted to be shunted by means of contact arm 38. It will be clear to those skilled in the art from the foregoing that the position of the galvanometer pointer 35 will be determined by the speed of the generator 29 which in turn will be determined by the speed of the motor 10. The motor speed in turn is controlled by the moment about the governor shaft 16 against which the centrifugal moment of the governor links acts. The arrangement is such that a high moment around governor shaft 16 tending to close the circuit of the motor through contact points 20 and 21 will permit the motor to run at a higher speed than when the torque about governor shaft 16 is reduced. As soon as the centrifugal force exercised by the governor overcomes the moment about the governor shaft, the contact point 20 will move away from contact point 21, opening the circuit and tending to slow down the motor. In actual practice, the motor armature receives a series of impulses approximately 20 per second. The motion of the contact point is extremely small, being between .06 to .003 of an inch. The motor inertia is such that a very smooth and very accurate control is achieved as a function of the moment applied by the governor shaft 16.

Our control system is directed to controlling the moment applied by the governor shaft 16, thus controlling the motor speed and all functions of motor speed which in the case of an altimeter would be altitude.

Referring now to Fig. 1, a shaft 39 is journalled in a bearing 40 mounted in a suitable support 41. A calibrated drum 42 is secured to the shaft for rotation therewith. Mounted above the drum 42 is a suitable indicator 43 adapted to show the position to which the drum is moved. Likewise secured to the shaft 39 for rotation therewith is a pinion 44 adapted to mesh with a gear segment 45. The gear segment is secured to a shaft 46 for rotation therewith. An arm 47 is secured to shaft 46 for rotation therewith, as is also an arm 48. The arm 48 carries a pin 49 adapted to engage one end 50 of a lever 51. The control shaft 16 has secured to it an arm 52 and an arm 53. The arm 53 is provided with a slot 54 in which a pin 55 is lodged. The pin 55 is carried by a link 56, the other end of which is pivoted by pin 57 to the arm 58 which forms the other end of the lever 51. The lever 51 is pivotally secured to a member 59 by means of screw 60. A spring 61 urges the end 58 of the lever 51 upwardly, as can readily be seen by reference to Figs. 1 and 4. A helical spring 62 is stretched between arm 52 secured to the governor shaft and arm 47 secured to shaft 46, as can readily be seen by reference to Figs. 1 and 6. Referring now to Fig. 6, one end of spring 62 is secured to the arm 52 by a pin 63. The other end of spring 62 is secured to a member 70 adapted to be nested within the coils of the spring 62. The member 70 is internally threaded and adapted to receive a screw 65. The screw 65 is secured to a bracket 66 by means of nut 67 and the screw head 68. The bracket 66 is pinned by means of pin 69 to the arm 47. Adjustment of the tension of spring 62 may be made by means of lengthening or shortening the position of the screw 65 with respect to the member 70 and the bracket 66. Adjustment may also be made by deadening a portion of the end turns of the spring 62 by means of the member 70.

The tension of the spring 62 is transmitted to governor shaft 16 through the arm 52 tending to rotate the governor shaft in a clockwise direction, opposing the centrifugal force exercised by the governor 12. It will be noted that the construction is such that when the shaft 46 is rotated counter-clockwise, the spring tension is lessened and the effective length of the arm 47 is shortened, thus raising the end of the spring 62 which is attached to arm 47. This increases the angularity of application of the tension of the spring on arm 52. Contrariwise, a lengthening of the spring tends to increase the effective lever arm of its application. The moment applied to the governor shaft thus depends on changes of spring length and changes of effective lever arm length. The construction is such that the angle of the arm, direction of pull, and magnitude of force tend to compensate, thus producing sensitivity. The use of a helical spring with the construction shown enables us to use calibrations of a practically linear function on the altitude drum 42.

Referring again to Fig. 1, we provide a pair of Sylphon bellows 71 and 72 adapted to act on the opposite ends of lever 73 which is secured to a shaft 74 mounted in suitable bearings 75 and 76 as can readily be seen by reference to Fig. 3. The upper ends of the bellows are sealed and their interiors are in communication at their lower ends with a manifold 77 which communicates through a conduit 78 with a fitting 79 which is connected by suitable piping to the airplane Pitot-static line (not shown). Communication with the interior of bellows 72 with the manifold 77 is controlled by a valve 80 controlled by a control knob 81. A small bellows 82 seals the Pitot-static line from pressure conditions within the plane. A spring 83 loads the valve and tends to keep it in seated position. The valve structure is shown in detail in Fig. 2. The valve 80 is secured to a valve stem 84 which is internally threaded. The knob 81 controls a screw 85. Rotation of the screw to move the valve to closed position collapses the bellows 82. Moving the valve to open position is done against the action of the spring 83 by rotation of the control knob 81. The ends of the bellows rocker lever 73 are secured to connecting rods 86 and 87 by pins 88 and 89. The connecting rods are threadedly secured to bushings 90 which are in turn threadedly lodged in the closure plates 91 of the bellows. The bushings 90 are formed at their upper ends with hexagonal portions 92 to provide for adjustment of the linkage between the bellows and the rocker lever 73. The bellows are supported by a framework 93 which is secured by means of stud bolts 94 and 95 to a casing 96 in which the mechanism is lodged, as can be seen by reference to Fig. 3.

An arm 97 is secured to the bellows shaft 74 for rotation therewith. This arm is formed with a slot 98 through which the pin 55 projects. Motion of the bellows shaft 74 is transmitted through arm 97 and pin 55 to the arm 53. Referring now to Figs. 1 and 3, it will be observed that the position of pin 55 governs the proportion of torque on the bellows shaft to the moment produced on the governor shaft by spring 62. When the pin 55 is toward the upper end of slots 54 and 98, we have in effect a short lever arm 97 acting through a long lever arm 53. This increases the effect of bellows force on the governor shaft. When the pin 55 is moved downwardly, the length of the arm 97 with respect to the length of the effective arm 53 is increased, thus reducing the effect of torque on the bellows shaft 74. Since the lever arm 52 through which the spring 62 acts is substantially fixed, the ratio of bellows effect to spring effect is determined by the position of pin 55. Referring now to Figs. 4, 5, and 7, it will be recalled that the lever 51 is pivotally mounted around screw 60 upon a member 59. The member 59 is in turn pivoted around pivot screw 99 secured to the support 41. The upper end of member 59 carries a vertical flexible member 100, adjacent the upper extremity of which is secured a pin 101 adapted to seat in a plurality of holes 102. Below the pin 101, there is secured to member 100 a pin 103. Around the pin 103 and between member 100 and the cover plate 104, we position a spring 105 normally urging the flexible member 100 into position where the pin 101 is retained in one of the holes 102. The pin 103 passes through a slot 106 formed in the cover plate 104. A handle 107 carrying an indicating pointer 108 is provided so that the pin 103 may be pulled to the right, as viewed in Fig. 5, against the action of spring 105, moving the pin 101 out of one of the holes 102. In this manner, the extension 100 may be rocked to the right and to the left, thus oscillating member 59 around its pivot 99. It will be observed that movement of member 100 to the right as viewed in Fig. 4 will rotate member 59 in a clockwise direction. Since the pivot screw 60 is to the left of the pivot screw 99, it will be raised when the member 59 is moved in a clockwise direction. Since the end 50 of lever 51 is resting against pin 49, the raising of pivot screw 60 will raise the right hand side 58 of the lever 51. This in turn will raise the link 56, moving the pin 55 upwardly in the slot to a position in which the greater effect is given to the torque generated by bellows shaft 74.

In operation, let us assume that a plane equipped with our invention is to take off from a landing field whose elevation is two thousand feet above sea level. The external circuit to our pressure responsive device is closed, thus energizing the conductors 24 and 25. This starts the motor 10. The drum 42 is set so that zero altitude appears under the indicator 43, thus placing a predetermined tension on the spring 62. This tension is communicated by arm 52 to the governor control shaft 16, the force being such as to tend to close contact point 20 upon contact point 21. When the motor reaches the predetermined speed, the governor 12 will operate to maintain it at that speed. The movement of the drum 42 is communicated to the shaft 39 and thence to bevel gear 109 which meshes with a bevel gear 110. The bevel gear 110 is secured to the shaft 111 which carries the arm 38. The other end of shaft 111 carries a bevel gear 115 which meshes with a bevel gear 116 which is secured to a shaft 117. The shaft 117 is secured to a rotary dial 112 mounted behind a cover plate 113 of the altimeter instrument face. The cover plate is provided with an opening 114 through which the galvanometer needle 35 is visible. The amplitude of motion of the galvanometer needle is but a segment of the cover plate 113 corresponding to the opening 114. In this manner we may use a comparatively small needle with a comparatively large dial face. The large dial face enables us to calibrate altitude in small increments. When the motor reaches the predetermined speed, let us say 500 revolutions per minute by way of example, a predetermined voltage will be generated by the generator 29. At zero altitude, most of the resistance 37 is shunted by the arm 38 so that only the residual resistance 36 is effective. The arrangement is such that the current will flow through both the shunt resistance 36 and the winding of the galvanometer 34. At the speed determined by the spring 62, the voltage produced is such that the galvanometer needle 35 will swing to the right as viewed in Figs. 8 and 9, registering a zero altitude. At zero altitude the maximum spring tension is placed on spring 62 as the drum 42 is moved in a counter-clockwise direction. Movement of the drum 42 in a counter-clockwise direction moves the shaft 111 in a clockwise direction, thus cutting out a portion of the shunt resistance 37. The rotation of the shaft 111 in a clockwise direction moves shaft 117 in a counter-clockwise direction, thus moving the zero altitude calibration of the dial 112 toward the right of the segmental opening 114, as can be seen by reference to Fig. 9.

The rotation of the drum 42 in a counter-clockwise direction to bring the zero altitude calibration in register with the indicator 43 rotates the shaft 39 in a counter-clockwise direction. This rotates gear segment 45 and shaft 46 in a clockwise direction, moving the arm 47 to the left as viewed in Figs. 1 and 6, thus placing maximum spring tension on the spring 62. The arm 48 is likewise moved in a clockwise direction as viewed in Figs. 1 and 4. This drops the pin 49 to its lowermost position, permitting the spring 61 to raise the right hand side 58 of lever 51 due to the fact that the left hand side 59 of lever 51 rests on the pin 49. The lowering of the pin 49 will therefore raise pin 55, giving a greater effect to the bellows force. Conversely, when the drum 42 is turned to a higher altitude, moving in a clockwise direction, the arm 47 will be moved in a counter-clockwise direction, reducing the tension on the spring 62 and increasing its angularity, thus reducing the effective lever arm of its application to control shaft 16. At the same time, the arm 48 will move in a counter-clockwise direction, raising the pin 49. The raising of the pin 49 will result in a lowering of the pin 55, thus reducing the movement applied to the governor shaft through arm 53 on account of torque around the bellows shaft 74. This correction is necessary to get true readings of altitude. We have seen that the moment opposing the centrifugal governor depends upon changes of spring length and changes of effective lever arm length. After the altitude drum 42 is set to zero altitude, the valve 89 is closed. As the plane moves to a higher altitude, the pressure within bellows 71 becomes less, while the pressure at the ground is sealed within bellows 72. This produces a clockwise force on the bellows shaft 74, thus applying a force through the pin 55 to the arm 53 against the force of the spring 62 tending to rotate the control shaft 16 in a counter-clockwise direction tending to open contact point 20, thus reducing the motor speed. The lower motor speed will produce a lower voltage, causing the galvanometer needle 35 to move in a counter-clockwise direction, registering a higher altitude on the dial 112. It will be seen that the pressure difference between the pressure existing in bellows 72 and sealed therein by the valve and the pressure of the surrounding atmosphere as communicated to bellows 71 through the Pitot-static line will determine the motor speed and hence the altitude reading. The relationship between a difference in motor speed with respect to a difference of pressure, in other words the ratio $dn/dp$ is the value with which we are concerned. Actually, this ratio changes slowly with variations in value of the motor speed or $n$. Within comparatively narrow limits, say five thousand feet of altitude, the assumption that $n$ is a constant is substantially valid. However, when the motor speed changes radically, this assumption is no longer tenable and if made, errors in altitude reading will result. It will be observed that the actual moment applied about bellows shaft 74 depends upon the pressure differential between the pressures in the Sylphon bellows, their effective areas, and the lengths of the arms of the rocker lever 73. The areas of the Sylphon bellows and the length of the arms of the rocker lever 73 are fixed. The effective force upon the governor control shaft, however, depends upon the position of the pin 55. In order to compensate for the change in the varying ratio $dn/dp$, we have found it is necessary to raise the pin 55 as the motor speed becomes less. The correction is a complex one and can be demonstrated mathematically. We have, however, determined the amount empirically and have given the arm 48 and the lever end 50 their correct proportions and shapes to maintain accurate readings over motor speeds between approximately 500 revolutions per minute and 80 revolutions per minute corresponding to altitudes from zero to fifty thousand feet. It will be understood by those skilled in the art that any suitable motor speed may be chosen. More simply stated, the construction is such that moving the drum 42 to a higher altitude so lessens the spring tension that it is necessary to reduce the effect of the bellows moment as a function of the reduction of motor speed. Continuing description of the operation of our device, we have set a zero altitude upon the drum 42, the motor having started. We then close the valve 80. It will be understood that as the plane ascends, the pressure in bellows 71 becomes less. The decrease in pressure in the free bellows allows a slight rotation of the rocker lever arm in a clockwise direction. The arm 97 moves the pin 55 to the left as viewed in Fig. 1. This force is exerted against the lever 53, reducing the spring action and decreasing the motor speed, thus registering a higher altitude.

It was assumed that the plane took off from an air field having an elevation above sea level of two thousand feet. We are interested in actual altitude from the ground. The barometric device measures pressure above sea level. When the plane, for example, reaches an altitude of four thousand feet, it will actually be six thousand feet above sea level. The spring effect is too strong for the bellows effect with the pin 55 positioned for zero altitude on the drum 42. We must, therefore, increase the effect of the bellows in accordance with the elevation of the landing field above sea level. This is done by moving the arm 100 to the right into one of the holes 102 which are suitably calibrated. Moving the arm 100 to the right will rotate the member 59 in a clockwise direction around its pivot screw 99. This will raise the pivot screw 60, permitting the spring 61 to raise the right hand side 58 of the lever 51, thus raising the link 56 and hence the pin 55. The raising of pin 55 will permit a greater force to be applied against the governor shaft 16 by reason of torque applied to the bellows shaft 74. Actually, the movements of the bellows lever arm and the bellows shaft are very minute, their principal function being to transmit moments and torques rather than actual movement. The minute movements involved substantially eliminate hysteresis and fatigue of the metal of the bellows so that accurate readings will result over long periods of time.

Let us continue to follow the operation of the device. It is assumed that the plane has now reached an altitude of say five thousand feet. This is noted by the pilot. He opens the valve 80, thus equalizing the pressure of the bellows. When this is done, the effect of the bellows is immediately lost and the motor speed increases, registering an altitude of zero on the galvanometer, due to the increased voltage generated by the generator 29 occasioned by the increased speed of the motor. The drum 42 is then rotated in a clockwise direction to register five thousand feet. This rotates the dial 112 in a clockwise direction, bringing the five thousand calibration to the position formerly occupied by the zero calibration mark. It also rotates shaft 39 in a clockwise direction, rotating shaft 46 in a counterclockwise direction, lessening the spring pressure. This reduces the speed of the motor and would ordinarily cause the galvanometer needle 35 to move to the left. The rotation of the drum 42 in a clockwise direction, however, also rotates arm 38 in a counter-clockwise direction, thus placing increased resistance in series with the shunt resistance 36. The increased resistance in the shunt permits the galvanometer needle to register maximum amplitude with a reduced voltage, so that we will find the galvanometer needle indicating an altitude of five thousand feet above the ground when the drum is moved to five thousand feet and the valve 80 has been opened at the altitude of five thousand feet. At this point, the valve 80 is closed. As long as the plane is at an altitude of five thousand feet the altimeter will register five thousand feet. Assume now that the plane reaches an altitude of six thousand feet. The pressure in bellows 71 is less than the pressure in bellows 72. This produces a torque about the bellows shaft in a clockwise direction, causing a force on pin 55 tending to rotate the arm 53 in a counter-clockwise direction against the action of spring 62, permitting the motor to slow down, thus producing a lower voltage on the generator 29 and registering a higher altitude by reason of the movement of the galvanometer needle 35 to the left. Assume now that the plane deviates to an altitude of four thousand feet. In this case the bellows pressure in bellows 71 will be greater than that in bellows 72. This will cause a moment in a counter-clockwise direction around the bellows shaft 74. The pin 55 will tend to move to the right as viewed in Fig. 1, adding its force to the spring force, and tending to rotate the governor control shaft in a clockwise direction. This will cause the motor to run at a higher speed, thus generating a higher voltage and moving the galvanometer needle 35 to the right, registering a lower altitude.

It will be recalled that we have applied a correction because of the elevation of the landing field above sea level. Let us assume that we are to land at another field whose elevation is at sea level. The pilot will then move the arm 100 to the left to a lower altitude by means of the knob 107. Moving the arm 100 to the left rotates the member 59 in a counter-clockwise direction, thus lowering the pivot screw 60 and lowering the pin 55. If the plane were flying at an altitude of seven thousand feet, for example, when this occurred, and the previous setting was two thousand feet for the elevation of the landing field from which the plane took off, the altimeter would show an altitude of nine thousand feet, which is the altitude above the landing field at sea level and is the value in which the pilot is interested. The effect is achieved by reducing the effect of the torque applied through the barometric system. But for the correction applied, as the plane approached the ground, the increase in pressure in bellows 71 would tend to speed up the motor proportionately higher than would be occasioned with the pin in a lower position. This would, therefore, register a lower altitude than the actual altitude. By raising the pin 55, the proportion is so changed that a true measure of altitude above the lower landing field is achieved. More simply stated, it will be seen that the arrangement is such that we must lower the pin 55 as higher altitudes are set on the drum 42, in order to compensate for the variation in ratio between changes in motor speed and changes in pressure, which ratio varies as a function of motor speed and hence a function of altitude above the ground. The altitude above the ground, however, is a direct function of the pressure of the surrounding air only when the ground is at sea level. When the ground is above sea level, we must reduce the lowering of the pin 55 by a proportional amount, that is, we must correct the correction in the manner described.

As higher altitudes are reached, the process is repeated, that is, the pressure is equalized and a new altitude is set on the altitude drum and instrument dial and the valve again closed while the plane is flying at the newly set altitude.

It will be seen that we have accomplished the objects of our invention. Our instrument operates by means of small pressure differences, so that the range of motion of the parts is substantially indiscernible. This results in the elimination of hysteresis and fatigue in the metal of the bellows. No correction for pressure in cabin of the airplane is necessary, since any alteration in that pressure is automatically compensated for by the use of two bellows. Any range of calibrations and any scale is easily achieved. Our instrument may be very readily calibrated by means of adjustment in the spring tension of the spring 61, by changes in the motor speed by means of the variable resistance 27 in the motor field, by changes in the resistance in the generator field by means of variable resistance 31, by changes in the resistance in the galvanometer shunt, or some or any of the foregoing means. Accurate altitude readings are obtained over all altitudes from sea level to fifty thousand feet or higher if desired. Our instrument is capable of measuring altitude differences of only fifteen feet at altitudes of twenty-five thousand feet. The altimeters known to the art do not read accurately within one hundred feet at these altitudes. Three simple adjustments, namely, the setting of the altitude drum, the setting of the landing field elevation, and the opening and closing of the valve 80 are all that is necessary.

It will be observed that our device is of general application and while we have described it with reference to an altimeter, it may be employed as a pressure responsive device in many applications.

For example, our invention is adapted to be used with a bombsight such as shown in co-pending application of Theodore H. Barth, Ser. No. 635,298, filed September 28, 1932, now Patent 2,480,357, in which the altitude drum controls the disk speed of a bombsight computer corresponding to given values of altitude. When the pilot makes his bombing run at a predetermined altitude, he may encounter disturbances due to updraft or downdraft conditions or last minute changes in bombing altitudes because of danger of collision with other bombing planes coming over the target from different directions or in order to avoid heavy anti-aircraft fire which becomes too uncomfortable. In this case, the valve is closed when the pre-set bombing altitude is reached, and changes in disk speed, the disk being driven from the motor 10, will automatically be made. In such case, the landing field elevation correction will be calibrated in target elevation as the bombardier is interested in the altitude over the target and not the altitude from sea level, since the bomb must fall from the plane to the target.

It will be further observed that many changes may be made in details without departing from the spirit of our invention. It is, therefore, to be understood that we are not to be limited to the specific details shown and described except within the ambit of the appended claims. Having thus described our invention, what we claim is:

1. In a pressure responsive speed controller, an electric motor, a control circuit for said motor, a switch in the control circuit, a centrifugal speed responsive device actuated by said motor for controlling said switch, a spring for opposing the action of the speed responsive device, pressure responsive means, and means actuated by the pressure responsive means for altering the effect of the spring whereby a variation of pressure upon said pressure responsive means controls the speed of the motor.

2. In a pressure responsive speed controller, a motor, speed control means for said motor, elastic means for actuating said speed control means, speed responsive means for opposing the action of said elastic means, fluid pressure responsive means, means for applying force from said fluid pressure responsive means to vary the action of said elastic means, and means for varying the mechanical advantage of said force applying means whereby to alter the effect of force from said pressure responsive means upon said elastic means.

3. An altimeter including in combination, a motor, speed control means for said motor, elastic means for actuating said speed control means, speed responsive means for opposing the action of said elastic means, fluid pressure responsive means, means for applying force from the fluid pressure responsive means to vary the action of said elastic means and means for varying the mechanical advantage of said force applying means as a function of altitude.

4. An altimeter including in combination, a motor, speed control means for said motor, elastic means for actuating said speed control means, speed responsive means for opposing the action of said elastic means, fluid pressure responsive means, means for applying force from the fluid pressure responsive means to vary the action of said elastic means, means for varying the mechanical advantage of said force applying means as a function of altitude, and a second means for varying the mechanical advantage of said force applying means proportional to the height of the ground over which the altitude is being measured above sea level.

RICHARD F. WEHRLIN.
ROBERT YOUNG.

REFERENCES CITED

The following references are of record in the file of this patent:

UNITED STATES PATENTS

| Number | Name | Date |
|---|---|---|
| 353,990 | Sperry | Dec. 7, 1886 |
| 469,257 | Leber | Feb. 23, 1892 |
| 1,184,460 | Koppitz | May 23, 1916 |
| 1,315,858 | Paulin | Sept. 9, 1919 |
| 1,579,038 | Smoot | Mar. 30, 1926 |
| 1,676,983 | Eremeeff | July 10, 1928 |
| 1,767,146 | Lee | June 24, 1930 |
| 1,848,053 | Bacon | Mar. 1, 1932 |
| 2,166,595 | Jenny | July 18, 1939 |
| 2,311,900 | Newell | Feb. 23, 1943 |
| 2,332,611 | Spencer | Oct. 26, 1943 |
| 2,366,897 | Grooms | Jan. 9, 1945 |
| 2,445,335 | Philbrook et al. | July 20, 1948 |

FOREIGN PATENTS

| Number | Country | Date |
|---|---|---|
| 356,945 | Great Britain | Sept. 17, 1931 |